Dec. 3, 1963     R. J. HLAVACEK ETAL     3,112,519
METHOD FOR STUNNING ANIMALS
Original Filed Aug. 12, 1959     2 Sheets—Sheet 1
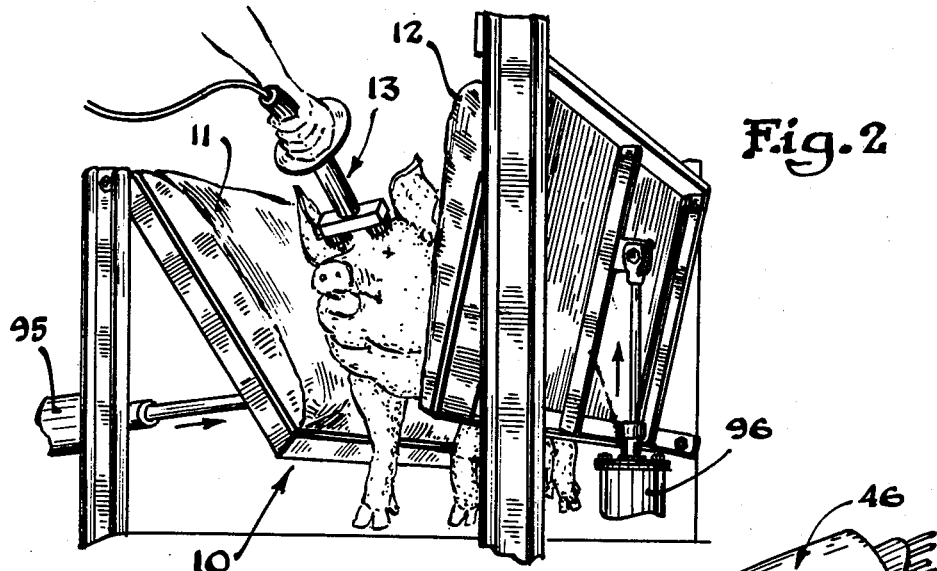
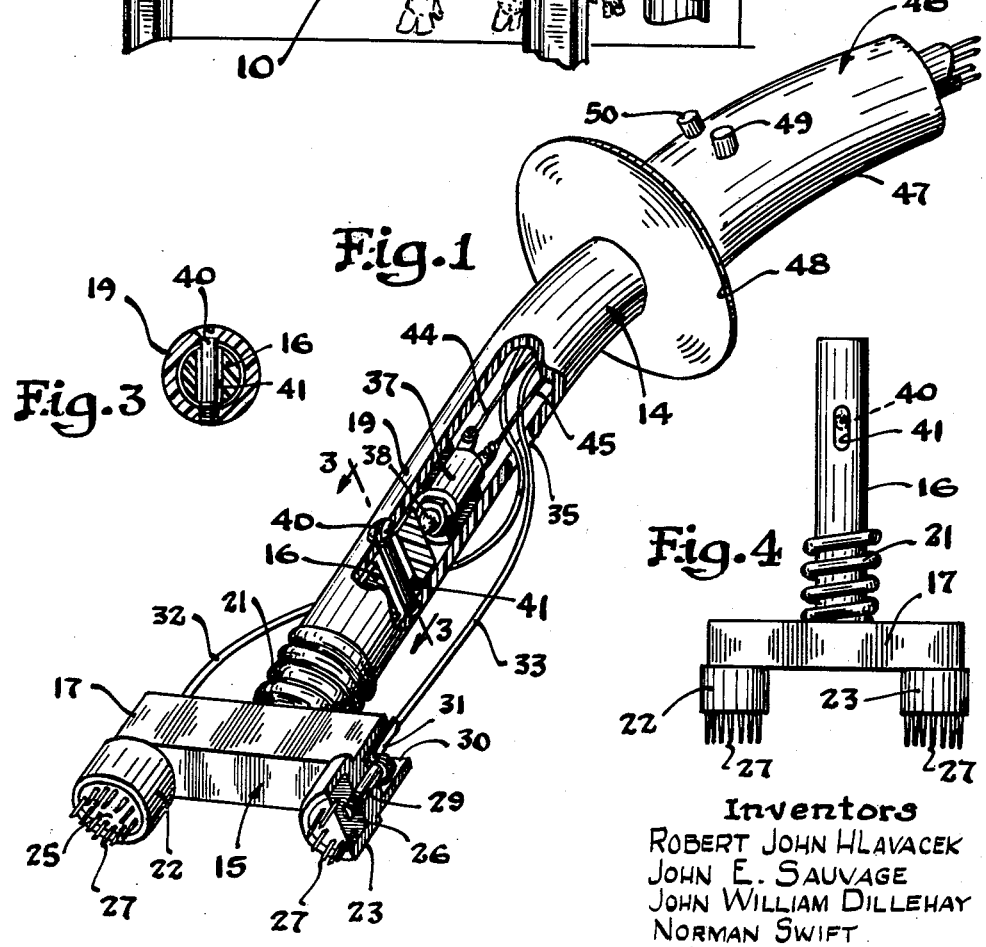
Inventors
ROBERT JOHN HLAVACEK
JOHN E. SAUVAGE
JOHN WILLIAM DILLEHAY
NORMAN SWIFT
By R. G. Story
Attorney Inventors
ROBERT JOHN HLAVACEK
JOHN E. SAUVAGE
JOHN WILLIAM DILLEHAY
NORMAN SWIFT By R.G. Story
Attorney

United States Patent Office 3,112,519
Patented Dec. 3, 1963

3,112,519
METHOD FOR STUNNING ANIMALS
Robert John Hlavacek, Clarendon Hills, John E. Sauvage, Chicago, John William Dillehay, Downers Grove, and Norman Swift, Oak Lawn, Ill., assignors to Swift & Company, Chicago, Ill., a corporation of Illinois
Original application Aug. 12, 1959, Ser. No. 833,288, now Patent No. 3,055,046, dated Sept. 25, 1962. Divided and this application May 22, 1961, Ser. No. 111,574
6 Claims. (Cl. 17—45)

This invention deals with an improved method for producing a state of unconsciousness in animals and slaughtering same. More specifically, this invention deals with a slaughtering operation wherein the animals are made insensitive to pain by means of an electric shock.

This application is a division of our prior copending application S.N. 833,288, filed August 12, 1959, relating to Method and Apparatus for Stunning Animals, now Patent No. 3,055,046.

Heretofore in slaughtering operations it has been the general practice to render only the larger animals, such as cattle, unconscious before proceeding to open the vascular system of the animal and allow it to bleed to death. Smaller animals, particularly hogs, have usually been allowed to bleed while conscious. The latter practice has been exposed to much public disapproval; and many operations designed to render the larger animals unconscious have also been criticized as being inhumane in that they were not always effective and often caused additional pain and suffering to the animal. Furthermore, recent federal legislation has been enacted requiring companies wishing to do business with agencies of the federal government to practice humane slaughtering methods designed to substantially eliminate pain and suffering to meat animals.

The usual practice for rendering cattle unconscious has been to strike each animal on its skull. This was originally performed by an operator standing above the animal and swinging a sledge hammer. More recently the stunning blow has been delivered by an operator using a captive bolt device. Both devices require skilled operators for, in either instance, if the operator's aim is inaccurate, or if the animal moves, the blow might not knock the animal out, but possibly inflict pain and suffering. In such instances the animal sometimes reacts violently, endangering the operator. Furthermore, it has been found that these operations are not readily adaptable to smaller animals due to the variable, and generally lighter, bone structure of the skull. Striking the head of smaller animals (and sometimes even the larger animals such as cattle) has often caused great damage to the brain and/or hemorrhaging throughout the carcass with a resultant loss of marketable products to the packer. Furthermore, such a blow has often killed the animal outright, thus making complete bleeding more difficult.

Some experimentation with electrical stunning of livestock has previously been undertaken. However, the results of this experimentation have not proven satisfactory as evidenced by the industry's nonacceptance of electric stunning up to the present time. Possibly the prior systems failed because it is difficult to obtain good electrical contact with the animal; and also because the systems depended on the judgment of an operator to determine when an animal had been sufficiently stunned. Additionally it has been found that electrically stunned animals have heretofore exhibited hemorrhaged lungs. This has caused problems in government inspected packing houses since the lungs of animals are carefully inspected for signs of pathological irregularities. Where the lungs of an animal have severely hemorrhaged the acceptability of the animal as being fit for human consumption is not easily determined. It is believed that the hemorrhaging is due to the fact that when an animal is shocked, electrically, its heart stops beating for a short period and then recovers at a faster rate; and its lungs stop for an even longer period of possibly 10–30 seconds. Also during the period of shock the animal goes into tonic convulsion and, while its body and limbs will not necessarily thrash about, blood will be squeezed from the capillaries into the vascular system. Thus when the animal's heart recovers there is a relatively larger amount of blood in the vascular system and the animal's blood pressure will surge to nearly double its normal value. Consequently the blood vessels tend to rupture at weak points such as the lungs and sometimes even throughout other portions of the animal's body.

Accordingly, it is a principal object of this invention to provide an improved method for rendering animals unconscious by electric shock.

A further object of this invention is to provide an improved method for rendering an animal insensitive to pain by means of electric shock, and then opening the vascular system of the animal in a manner avoiding any substantial amount of internal hemorrhaging in the animal.

We have found that by sticking the animal within about four and one-half seconds after it is stunned electrically substantially all of the lung hemorrhaging can be avoided. Therefore we have devised a system for restraining, stunning, and sticking an animal as rapidly as possible with the interval between the last two steps not exceeding approximately four and one-half seconds and preferably under four seconds. In brief, our method involves restraining the animal from movement, under its own power, and then applying an electric current to the head of the animal at a potential above about 110 volts for a selected time interval sufficient to insure unconsciousness of the animal. When the animal is unconscious the current is stopped and the major blood vessels in the neck of the animal are severed within about four and one-half seconds after the current is terminated. Subsequently, the animal is allowed to bleed and the usual processing operations are undertaken. Our apparatus for applying an electric current to an animal comprises a pair of spaced electrical contact means which penetrate the surface of the animal's epidermis, and a means for automatically connecting the contact means with the source of the electrical energy only upon the application of sufficient force to cause the contact means to penetrate the animal's skin and thereby provide good electrical contact with said animal.

One embodiment of the apparatus for carrying out the present invention has been illustrated in the accompanying drawings, but it is to be expressly understood that said drawings are for purposes of illustration only and are not to be taken as a definition of the limits of the invention, reference being had to the appended claims for this purpose. In said drawings:

FIGURE 1 shows the device with parts broken away for applying electric current to an animal;

FIGURE 2 shows an operator forcing the device of FIGURE 1 against the head of a restrained animal;

FIGURE 3 is a sectional view taken at line 3—3 in FIGURE 1;

FIGURE 4 is a plan view of a portion of the device of FIGURE 1;

Figure 5:
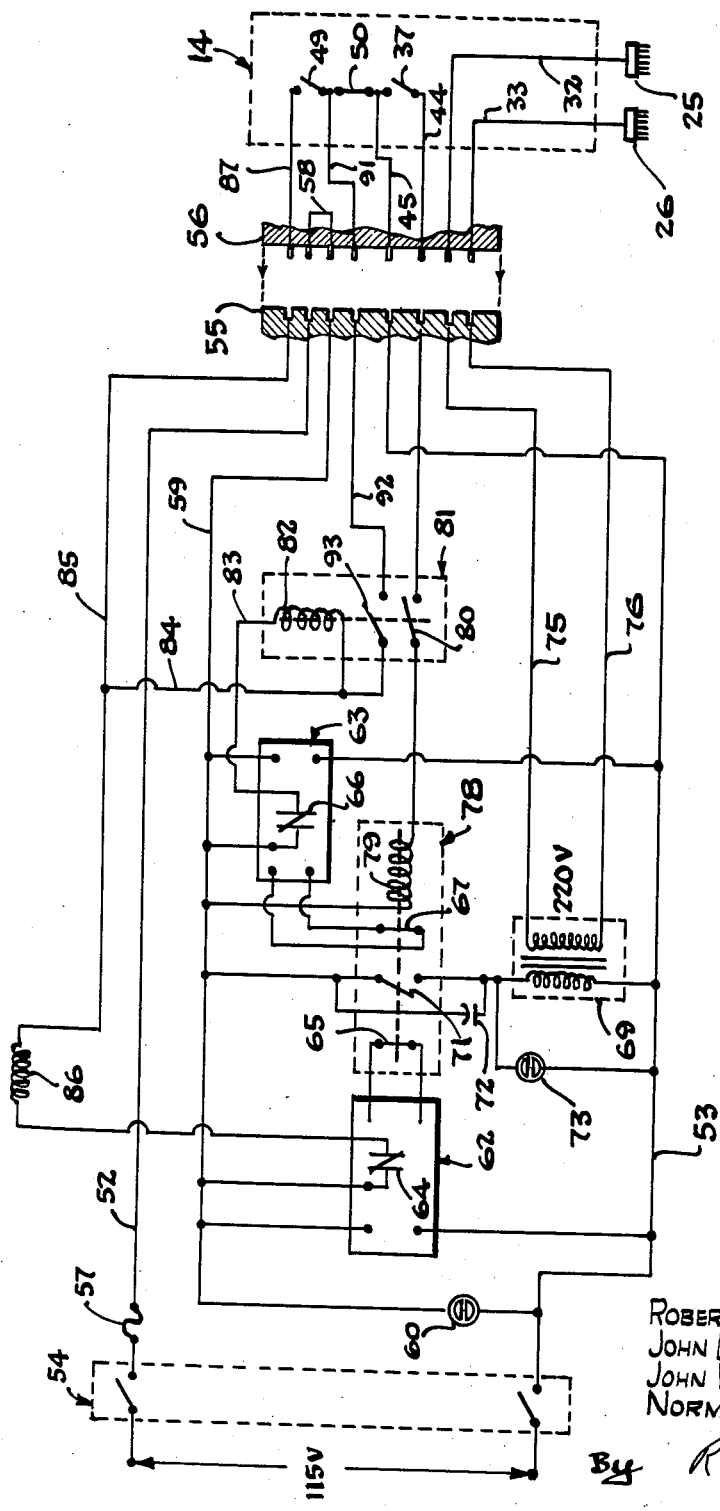

And FIGURE 5 is a diagramatic wiring circuit showing an electrical system for operating the device of FIGURE 1.

In practicing our invention, an animal is brought into position and restrained so that its head is exposed while it is powerless to move away from the operator. The illustrated restraining apparatus generally 10, comprises two movable cushions 11 and 12 which are movable to engage the sides of the animal. The details of such a restraining device are covered by a separate, copending patent application, now Patent No. 3,051,984.

While the animal is so prevented from moving an electric current of about 250 milliamperes at a potential of 110 volts or greater is caused to pass through a portion of the animal's head between two areas spaced about 2½ inches apart, center to center, at a location approximately one inch directly above the animal's eyes.

The current is caused to flow for a short period of one or more seconds or until the animal is clearly unconscious. The animal is then immediately released so that it drops on one side. The blood vessels in the throat are then severed within a time period not exceeding about 4½ seconds, and preferably within 4 seconds, after the electrical current is terminated.

We have found that the amount of current and/or the time of current application necessary to render an animal unconscious varies in direct proportion with the age, and to some extent with the size of the animal. It is believed that this may be due to the insulating effect of heavier tissue and/or bone structure in the animal's head. Hogs, for instance, are commonly marketed at weights ranging from about 150 pounds to 900 pounds. However, it was found that with lighter hogs of about 150 to 200 pounds, a current of about 250–450 milliamperes at a potential of about 110 volts applied for one second was sufficient to render an animal unconscious; while heavier or older hogs required an application of substantially the same current for periods of from two to three seconds if they were to be rendered sufficiently unconscious. Similarly, it was found that if the voltage was increased to about 220 volts, the heavier animals could be rendered unconscious in about 1½ to 2 seconds. The current at the latter voltage is in the order of about 550–1000 milliamperes (it being understood that the current in each instance depends upon both the voltage and physical characteristics of the individual animal). Furthermore, even larger animals may be rendered unconscious by employing either greater voltages or longer periods of application. We have found it preferable to provide for the application of a fixed potential of about 220 volts over a variable period of time so that a wide range of types and size animals may be stunned with the same system.

Referring to FIGURE 1, our stunning instrument, generally 13, may be seen to comprise a handle, generally indicated as 14, and a T member 15 telescopically mounted at the forward end thereof. The T member 15 shown in FIGURE 4, includes a stem 16 and cross-piece 17, and is preferably made of an electrically nonconductive material. Nylon plastic has been found to be particularly suitable. The stem of T member 15 is machined to be freely slidable within the interior of a pipe 19 forming the skeleton of handle member 14. The pipe 19 is also preferably formed of non-conductive material such as polyvinyl chloride. A resilient means such as a compression spring 21 is positioned about the stem 16 between cross-piece 17 and the end of pipe 19 to normally urge the cross-piece away from the pipe.

At each end of cross-piece 17 and positioned on the forward face thereof, with respect to pipe 19, are receptacles 22, 23 formed of non-conductive material. Usually the receptacles 22, 23 may be formed integrally with the T member 15. Within each receptacle are inserts 25, 26, respectively, formed of an electrically conductive material. Each insert in turn contains a plurality of metallic pins 27 imbedded therein which extend forwardly of receptacles 22, 23, approximately one-quarter inch. In practice it has been found preferable to form the foregoing apparatus so that the centers of receptacles 22, 23 are located approximately two and one-half inches apart; and of a size sufficient to allow the pins 27 to be positioned in circular configurations of approximately ¾ inch in diameter.

Each insert 25, 26 is held within its receptacle 22, 23 by means of a metal bolt 29 extending from the rear side through cross-piece 17 from the rear side. The rear face of cross-piece 17 may be recessed as shown at 30 in FIGURE 1 to form seats for bolts 29. Each bolt 29 also extends through an electrical connector 31 at the rear face of cross-piece 17, which is thereby placed in electrical connection with the respective inserts 25, 26. Wires 32, 33 extend from the connectors 31 (for inserts 25, 26 respectively) through an opening 35 in pipe 19 and thence to an electrical control system which will be later described.

Located within pipe 19 just forward of the opening 35 is a normally open momentary contact type switch 37. The switch is of a type available commercially, such as the Cutler Hammer No. 8411K3. Trip button 38 of switch 37 requires about ⅛ inch movement for actuation and is located about 1/32 inch from the end of stem 16 when spring 21 is uncompressed. Stem 16 is movable longitudinally within pipe 19. The latter has a guide pin 40 secured therein cooperative with a slot 41 in the stem 16. Slot 41 limits travel of the stem 16 to approximately ¼ inch, so as to enable actuation of switch 37 when cross-piece 17 of T member 15 is forced rearwardly against the action of compression spring 21. The spring preferably has a constant of about 130 pounds per inch which will therefore require approximately 20 pounds of force to compress sufficiently to allow stem 16 to close switch 37. A force of about 20 pounds has been found to insure that pins 27 penetrate the animal's skin and thereby make a good electrical contact with the animal. Wires 44, 45 connect the switch 37 with the electrical control system to be later described.

At the rear of handle 14 opposite T member 15 is a hand grip generally 46. The hand grip consists of a tubular rubber section 47 and a guard 48 at the forward end thereof. The operating button on another momentary contact switch 49 is located in the hand grip 46 and extends through the rubber tube section 47 where it may be conveniently actuated by the operator. Switch 49 is normally open and is connected by way of the electrical control system, to be described, to actuate the restraining device 10. Similarly an additional switch 50 is located in the hand grip 46, with the button thereof extending through the rubber tube 47, for reversing or opening the restraining device.

The electrical control circuit is illustrated in FIGURE 5. It is adapted to be operated from an ordinary 115 volt, 60 cycle alternating current supply. Wires 52 and 53 connect the control circuit with the source of alternating current. A suitable switch 54 is provided between the source and the control circuit. Also a disconnectable junction between the control circuit proper, and the electrical elements in handle 14 is provided by way of a receptacle 55 and plug 56. In FIGURE 5 it may be seen that supply line 52 contains a fuse 57. Wire 52 runs to receptacle 55 where it is connectable with a wire 58 in the plug 56. Wire 53 in turn is returned to the plug and is connectable with another wire 59 in the receptacle. Wire 59 forms one side of the power supply to the control circuit; and a neon lamp 60 is connected across wires 59 and 53 to indicate when the circuit is completed between the source of alternating current and the elements in handle 14.

A pair of control timers 62, 63 are connected across wires 53 and 59 to supply the internal timing elements (not shown) with power. (A suitable timer is produced by Photoswitch Inc. Catalogue No. 80HL1 Mod. 1000C.) Timer 62 contains a normally closed control switch 64 and a normally closed timer actuator switch 65. The timing element is connected to begin its cycle when switch 65 is opened. Subsequently, control switch 64 will be automatically opened when the timer has completed the run-down of a selected time interval.

Similarly, timer 63 includes a control switch 66 and a timer actuator switch 67, both normally closed and operating in the same fashion as switches 64, 65, respectively, of timer 62. It will become apparent that timer 62 controls the period during which the restraining apparatus, generally 10, will be actuated to confine an animal; and timer 63 controls the duration of electric shock applied to an animal.

The input side or primary winding of a transformer 69 is connected across power supply wires 53 and 59 through a normally open switch 71. Due to the high inductive properties of the transformer coil, switch 71 is provided with a spark suppressing condenser circuit 72. Additionally, a second neon lamp 73 is connected between switch 71 and wire 53 in parallel with the primary winding of transformer 69 to indicate when power is being delivered to the transformer 69 (and, hence, available at the sets of pins 27 on the stunning instrument 13).

The secondary winding or output side of transformer 69 is connected by means of wires 75, 76 to the receptacle 55 and are thereby connectable with wires 32, 33 running between plug 56 and inserts 25, 26, respectively, on the stunning instrument 13. In the preferred embodiment the secondary winding of transformer 69 boosts the line voltage to 220 volts A.C. in wires 75, 76.

Still referring to FIGURE 5, it may be seen that previously described switches 65, 67 and 71 form part of a three-switch relay generally 78. The relay 78 includes a solenoid 79 connected between wire 59 and receptacle 55 through a switch 80, which is normally open. The connection between switch 80 and receptacle 55 corresponds to, and is connectable with, wire 44 leading from plug 56 to the switch 37 in handle 14 (the latter switch being actuated when the device is pressed against an animal to be stunned).

Switch 80 is part of a two-switch relay generally 81 having a solenoid 82. The solenoid 82 is connected by wire 83 with one side of the control switch 66 in timer 63 and thence to wire 59. The other lead of solenoid 82 is connected by a wire 84 to a wire 85 connected between receptacle 55 and one side of a solenoid 86 associated with the restraining device 10. In turn, wire 85 is connectable with a wire 87 between plug 56 and the hand-operable switch 49 located on the hand grip 46 of stunning instrument 13. It may be seen (in FIGURE 5) that switches 49 and 37 are connected in series by the switch 50 which is also shown (FIGURE 1) on the hand grip 46. As will later become clear, switch 50 is provided to manually release the restraining device generally 10. However, it is not absolutely necessary and may be eliminated where it is acceptable to rely on timed operation alone. Furthermore, the wiring may be easily rearranged so that switch 50 can be located either on the handle 14 or the chassis of the control circuit.

An additional wire 91 is connected from between switches 49 and 50 to the plug 56. At receptacle 55 a wire 92, connectable with wire 91, runs to the second switch 93 of relay 81. The other side of switch 93 in turn is connected with solenoid 82 through wire 84 providing a holding circuit for relay 81 and solenoid 86.

Operation of the stunning device may now be followed. The operator first connects plug 56 with receptacle 55 and closes switch 54 to connect the stunning instrument 13 and electrical circuit to the source of alternating current. If the connections are properly made, lamp 60 will light; however, no power will be delivered to the pins 27 until switch 71 is closed connecting the transformer across the power supply. This can be done only when the solenoid of relay 78 is energized by closing both switches 80 (within the control circuit) and switch 37 (on the stunning instrument 13).

When an animal is advanced to the restraining apparatus generally 10 the operator pushes button 49 on hand grip 46 momentarily closing switch 49 within handle 14. Since switch 49 is connected in series with wire 53 through normally closed switch 50 and wire 45, power will be supplied to one side of solenoid 86. The opposite side of solenoid 86 is connected through the normally closed control switch 64 of timer 62 to wire 59 and thence wire 52 of the power supply. Thus when switch 49 is closed solenoid 86 will be actuated. This action initiates operation of the restrainer 10 by causing air under pressure to be delivered to cylinders 95 and 96, thus moving the cushions 11 and 12 to engage the animal. At the same time the solenoid 82 of relay 81 is energized since it is connected across wires 85 and 59 by wire 84 and wire 83 (through the normally closed control switch 66), respectively. Both switches 80 and 93 will be closed by solenoid 82. Once switch 93 is closed, solenoid 82 will be maintained energized (regardless of the position of switch 49) through wires 92, 91 and switch 50 to wire 45 and thence wire 53. Only the opening of switch 50 or the timing control switch 66 will cause solenoid 82 to be de-energized. Solenoid 86 will similarly be maintained energized until switch 50 or the time control switch 64 is opened.

Since switch 80 is also closed by the energizing of solenoid 82, it is now merely necessary to close switch 37 to energize the solenoid 79 of relay 78 whereby switch 71 will be closed to place the primary coil of transformer 69 across the power supply. As previously described, switch 37 can be closed only by placing the T member 15 of the stunning instrument 13 against an animal and applying a force of approximately 20 pounds along the handle 14. When this is done, the stem 16 of T member 15 will move a distance within the handle to close switch 37 thus energizing solenoid 79. At this time the solenoid 79 will close switch 71 and open timer actuator switches 65 and 67. Opening the latter switches commences the time cycle of timers 62, 63. So long as the stunning device is held against the animal with the required force the time run-downs will continue and electrical power will be supplied from the secondary winding of transformer 69 through wires 75—32 and 76—33 to the pins 27. However, if the device is released, switch 37 will open de-energizing solenoid 79 and thus causing the timers to reset and power to be disconnected from the transformer.

Upon the completion of the time run-down for timer 62, control switch 64 will open, disconnecting the power to solenoid 86, thus releasing the restraining apparatus generally 10. Similarly, when the time run-down of timer 63 is completed, control switch 66 will be opened breaking the connection to the solenoid 82 of relay 81. When this occurs, switch 80 is opened and regardless of the position of switch 37, solenoid 79 of relay 78 will be de-energized. When the latter occurs, switch 71 is opened, removing power from transformer 69 and consequently removing power from pins 27. Concurrently, actuator switches 65 and 67 are reclosed, causing the timers to reset and control switches 64 and 66 to reclose. However, solenoid 86 will not be immediately re-energized due to the fact that switch 49 is normally open and switch 93, providing the holding circuit for both solenoids 86 and 82 has been opened.

In practice it has been found desirable to set timer 62 to run down a fraction of a second prior to run-down of timer 63. Since it takes a short period of time for the pneumatic system, supplying cylinders 95 and 96, to respond to the action of solenoid 86, the animal will not be immediately released upon de-energiziing the solenoid. Thus the animal will not fall away from the stunning device prior to the time that timer 63 runs down and ends the application of stunning current to the animal. However, timing in this matter provides for the quickest possible release of the animal after stunning; and enables the sticking operation to be carried out at the greatest speed.

The foregoing description is for the purpose of complying with 35 U.S.C. 112, and we do not desire to be limited to the exact details shown and described, for obvious modifications will be apparent to those skilled in the art to which this most nearly appertains, and such modifications may be made without departing from the spirit of the invention.

We claim:

1. In an animal slaughtering process the steps comprising: applying an electric shock to an animal for a period of time sufficient to render the animal unconscious; and sticking the animal within about 4½ seconds after said period of applying said electric shock.

2. In an animal slaughtering process the steps comprising: passing an electric current between two points spaced above the eyes of an animal for a period of time sufficient to render the animal unconscious; and opening the vascular system of the animal by cutting the neck of the animal within about 4½ seconds after said period.

3. In an animal slaughtering process the steps comprising: applying an electric potential in excess of about 110 volts between two points spaced above the eyes of an animal; passing an electric current in the order of above about 250 milliamperes between said points for a selected time interval sufficient to render the animal unconscious; terminating the current at the end of said interval; and quickly opening the vascular system of the unconscious animal after terminating the current.

4. In an animal slaughtering process the steps comprising: applying an electric potential in excess of about 110 volts between two points spaced above the eyes of an animal; passing an electric current in the order above about 250 milliamperes between said points for a selected time interval sufficient to render the animal unconscious; terminating the current at the end of said interval; and opening the vascular system of the unconscious animal within about 4½ seconds after terminating the current.

5. A method of slaughtering animals, said method comprising the steps of: restraining an animal from movement; electrically shocking the animal by applying a current above about 250 milliamperes at a potential within the range of 110 to 220 volts between two areas on the animal's head, said areas being located about 1 inch above the eyes of said animal and spaced apart about 2½ inches; continuing the current for a period of between 1 to 4 seconds in accordance with the size and age of said animal whereby it is rendered unconscious; and sticking the animal within about 4½ seconds after said period during which the current is applied.

6. A method of slaughtering animals, said method comprising: passing an electric current between two areas on the head of an animal, said areas located approximately 1 inch above the eyes of said animal and spaced about 2½ inches, said current being in the order of above about 500 milliamperes at a potential of about 220 volts; terminating the current after a period of between 1 to 4 seconds; and opening the vascular system of the animal within an interval of 4 seconds after terminating the current.

References Cited in the file of this patent

FOREIGN PATENTS 154,157    Switzerland _____ July 1, 1932